US012750111B2

(12) United States Patent
Kadambar et al.

(10) Patent No.: US 12,750,111 B2
(45) Date of Patent: Sep. 29, 2026

(54) METHOD AND APPARATUS FOR PERFORMING CSI PREDICTION

(71) Applicant: Samsung Electronics Co., Ltd., Suwon-si (KR)

(72) Inventors: Sripada Kadambar, Bangalore (IN); Ashok Kumar Reddy Chavva, Bangalore (IN); Anirudh Reddy Godala, Bangalore (IN); Ashok Kumar Sahoo, Bangalore (IN); Ankur Goyal, Bangalore (IN); Anusha Gunturu, Bangalore (IN); Divpreet Singh, Bangalore (IN); Ashwini Kumar, Bangalore (IN); Chaiman Lim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 241 days.

(21) Appl. No.: 18/636,864

(22) Filed: Apr. 16, 2024

(65) Prior Publication Data

US 2024/0259070 A1 Aug. 1, 2024

Related U.S. Application Data

(63) Continuation of application No. PCT/KR2022/016593, filed on Oct. 27, 2022.

(30) Foreign Application Priority Data

Oct. 27, 2021 (IN) ............................ 202141049155
Oct. 17, 2022 (IN) ............................ 2021 41049155

(51) Int. Cl.
*H04B 7/06* (2006.01)

(52) U.S. Cl.
CPC ......... *H04B 7/0626* (2013.01); *H04B 7/0632* (2013.01)

(58) Field of Classification Search
CPC ............................ H04B 7/0626; H04B 7/0632
See application file for complete search history.

(56) References Cited

U.S. PATENT DOCUMENTS 11,552,688 B2 * 1/2023 Rose .................... H04B 17/373
12,549,989 B2 * 2/2026 Li ........................ H04B 7/0695
(Continued)

FOREIGN PATENT DOCUMENTS

CN 112637094 A 4/2021
CN 114424623 A 4/2022
(Continued)

OTHER PUBLICATIONS

Machine Learning-Based 5G- and-Beyond Channel Estimation for MIMO-OFDM Communication Systems, Jan. 2021.
(Continued)

*Primary Examiner* — Zaihan Jiang
(74) *Attorney, Agent, or Firm* — Jefferson IP Law, LLP

(57) ABSTRACT

A method for performing a channel state information (CSI) prediction by a user equipment (UE) is provided. The method includes receiving a plurality of reference signals from a base station, obtaining a channel quality information (CQI) estimation for an interval based on the received plurality of reference signals, wherein obtaining the CQI estimation includes obtaining at least one of mean mutual information per bit (MMIB) or effective exponential signal to noise ratio mapping (EESM), predicting the CSI based on the CQI estimation, and reporting the predicted CSI to the base station.

20 Claims, 16 Drawing Sheets

(56) References Cited

U.S. PATENT DOCUMENTS

| | | | | |
|---|---|---|---|---|
| 12,568,515 | B2 * | 3/2026 | Stark | H04L 1/0026 |
| 2015/0092583 | A1 * | 4/2015 | Balraj | H04B 7/0417 370/252 |
| 2019/0393981 | A1 * | 12/2019 | Feki | H04W 36/0055 |
| 2020/0235795 | A1 | 7/2020 | Hwang et al. | |
| 2021/0211912 | A1 * | 7/2021 | Zeng | H04L 5/1461 |
| 2022/0376957 | A1 | 11/2022 | Song | |
| 2023/0325654 | A1 * | 10/2023 | Marzban | G06N 3/082 706/25 |

FOREIGN PATENT DOCUMENTS

| | | | |
|---|---|---|---|
| WO | WO-2015/165514 | * | 4/2014 |
| WO | 2015/154800 | A1 | 10/2015 |
| WO | WO-2020/213964 | * | 4/2020 |
| WO | 2020/213964 | A1 | 10/2020 |

OTHER PUBLICATIONS

Indian Office Action dated Jan. 1, 2024, issued in Indian Patent Application No. 202141049155.

International Search Report and Written Opinion dated Feb. 6, 2023 issued in International Patent Application No. PCT/KR2022/016593.

Extended European Search Report dated Jan. 7, 2025, issued in European Application No. 22887651.2-1206.

Kadambar et al., Learning Based CSI Feedback Prediction for 5G NR; XP 33885078 A; 2021 IEEE 18th Annual Consumer Communications & Networking Conference (CCNC), Jan. 9, 2021.

Combined Fast Link Adaptation Algorithm in LTE Systems; XP 32119942 A; 2011 6th International 1131 Conference on Communications and Networking in China (CHINACOM), Aug. 17, 2011.

* cited by examiner

METHOD AND APPARATUS FOR PERFORMING CSI PREDICTION

CROSS-REFERENCE TO RELATED APPLICATION(S)

This application is a continuation application, claiming priority under § 365(c), of an International application No. PCT/KR2022/016593, filed on Oct. 27, 2022, which is based on and claims the benefit of an Indian provisional application No. 20/214,1049155, filed on Oct. 27, 2021, in the Indian Intellectual Property Office, and of an Indian Complete application No. 202141049155, filed on Oct. 17, 2022, in the Indian Intellectual Property Office, the disclosure of each of which is incorporated by reference herein in its entirety.

BACKGROUND

1. Field

The disclosure relates to wireless communication networks. More particularly, the disclosure relates to prediction of channel state information (CSI) at a transmitter in multiple input and multiple output (MIMO) systems in wireless communication networks.

2. Description of Related Art

A wireless propagation environment can comprise of multipath interference (which can occur due to superposition of multiple transmit signal copies) and multipath fading (which can occur due to variations in the received signal strength arising due to multipath propagation). The fading can be large-scale or slow fading (which can be caused by path loss, distance from base station (BS), user equipment (UE) motion, and so on) or small-scale or fast fading (which can be caused by multipath communication). Small-scale fading can vary across the bandwidth (frequency selective) and can be mitigated by approaches, such as, channel state information (CSI) feedback, and link adaptation using CSI.

In an approach, fading can be handled via link adaptation, wherein channel fading, due to environmental factors and UE motion, is handled. Link adaptation can be inner-loop or UE feedback based or outer-loop or hybrid automatic repeat request (HARQ) statistics based. Outer-loop link-adaptation can increase data rate if block error rate (BLER) is below a threshold (say 5%) or decrease data rate if the BLER if above a threshold (say 10%). The BLER is a percentage of block of data that is decoded incorrectly at the receiver over a predefined time interval. The inner-loop procedure can receive reference signals (RSs) from a next generation node B (gNB), estimating channel capacity, reporting a channel quality information and pre-coding matrix indicator, and rank indicator (CQI+PMI+RI), and scheduling data by the gNB with the reported CSI (which can be repeated). The gNB corresponds to a fifth-generation (5G) base station in operation.

Consider an example of CSI reporting being performed periodically. The CSI reports may be shared with the gNB by the UE once every TRP=10 slots. Correlation of the actual channel at the UE does not increase with time with respect to channel instance for feedback. Hence, throughput in slots away from the reported instance may be lower than the slots which are closer. The current solutions increase the reporting frequency. However, this can result in a higher frequency of reporting, leading to higher reporting overhead, and hence a lower system throughput. In addition, this is not in the UE's control.

Another solution is to improve channel aging effect using channel prediction, which comprises of performing channel prediction followed by CSI estimation. The process includes both prediction and estimation blocks implemented in hardware. However, this can be computationally expensive, hence difficult to implement, and current methods cannot be scaled to higher bandwidths or higher rank MIMO.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide methods and systems for performing low complexity channel state information (CSI) prediction, which enables prediction of CSI using a low computation complexity machine learning (ML) based solution.

Another aspect of the disclosure is to provide methods and systems for performing low complexity CSI prediction, which can co-exist and seamlessly integrate with existing CSI estimation methods.

Additional aspects will be set forth in part in the description which follows and, in part, will be apparent from the description, or may be learned by practice of the presented embodiments.

In accordance with an aspect of the disclosure, a method for performing CSI prediction by a user equipment (UE) is provided. The method includes receiving a plurality of reference signals from a base station, obtaining channel quality information (CQI) estimation for an interval based on the received plurality of reference signals, wherein obtaining the CQI estimation comprises obtaining at least one of mean mutual information per bit mean mutual information per bit (MMIB) or effective exponential signal to noise ratio mapping (EESM), predicting the CSI based on the CQI estimation, and reporting the predicted CSI to the base station.

In accordance with another aspect of the disclosure, a UE for performing CSI prediction is provided. The UE includes memory and one or more processors coupled to the memory, wherein the memory store one or more computer programs including computer-executable instructions that, when executed by the one or more processors, cause the UE to receive a plurality of reference signals from a base station, obtain CQI estimation for an interval based on the received plurality of reference signals, wherein obtaining the CQI estimation comprises obtaining at least one of MMIB or EESM, predict the CSI based on the CQI estimation, and report the predicted CSI to the base station.

In accordance with another aspect of the disclosure, a method for performing CSI prediction by a base station (BS) is provided. The method includes receiving a plurality of reference signals from a user equipment (UE), obtaining CQI estimation for an interval based on the received plurality of reference signals, wherein obtaining the CQI estimation comprises obtaining at least one of MMIB or EESM, and predicting the CSI for the UE based on the CQI estimation.

In accordance with another aspect of the disclosure, a BS for performing CSI prediction is provided. The BS includes memory and one or more processors coupled to the memory, wherein the memory store one or more computer programs including computer-executable instructions that, when executed by the one or more processors, cause the BS to receive a plurality of reference signals from a UE, obtain CQI estimation for an interval based on the received plurality of reference signals, wherein obtaining the CQI estimation comprises obtaining at least one of MMIB or EESM, and predict the CSI for the UE based on the CQI estimation.

In accordance with another aspect of the disclosure, one or more non-transitory computer-readable storage media storing computer-executable instructions that, when executed by one or more processors of a user equipment, cause the user equipment to perform operations are provided. The operations include receiving a plurality of reference signals from a base station, obtaining CQI estimation for an interval based on the received plurality of reference signals, wherein obtaining the CQI estimation comprises obtaining at least one of MMIB or EESM, predicting the CSI based on the CQI estimation, and reporting the predicted CSI to the base station.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

DETAILED DESCRIPTION

Figure 1:
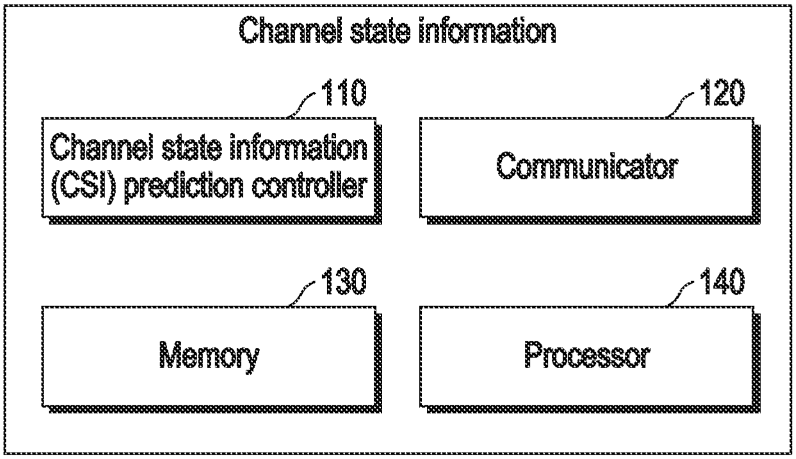
FIG. 1 illustrates a user equipment (UE) performing a channel state information (CSI) prediction according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The aspects of the disclosure achieve methods and systems for performing low complexity CSI prediction. Referring now to the drawings, and more particularly to FIGS. 1 to 9, 10A to 10C, and 11 to 15, where similar reference characters denote corresponding features consistently throughout the figures, there are shown at least one aspect of the disclosure.

Aspects of the disclosure relates to methods and systems for performing low complexity CSI prediction, which enables prediction of CSI using a low computation complexity machine learning (ML) based solution. Aspects of the disclosure relates to methods and systems for performing low complexity CSI prediction, which can co-work with existing CSI estimation methods (such as mean mutual information per Bit (MMIB) and exponential effective SINR metric (EESM) available in currently available UEs. Embodiments herein disclose methods and systems for performing low complexity CSI prediction, which can be designed for seamless integration with the current UE CSI estimation algorithms as a software-only solution.

It should be appreciated that the blocks in each flowchart and combinations of the flowcharts may be performed by one or more computer programs which include computer-executable instructions. The entirety of the one or more computer programs may be stored in a single memory or the one or more computer programs may be divided with different portions stored in different multiple memories.

Any of the functions or operations described herein can be processed by one processor or a combination of processors. The one processor or the combination of processors is circuitry performing processing and includes circuitry like an application processor (AP, e.g., a central processing unit (CPU)), a communication processor (CP, e.g., a modem), a graphical processing unit (GPU), a neural processing unit (NPU) (e.g., an artificial intelligence (AI) chip), a wireless-fidelity (Wi-Fi) chip, a Bluetooth™ chip, a global positioning system (GPS) chip, a near field communication (NFC) chip, connectivity chips, a sensor controller, a touch controller, a finger-print sensor controller, a display drive integrated circuit (IC), an audio CODEC chip, a universal serial bus (USB) controller, a camera controller, an image processing IC, a microprocessor unit (MPU), a system on chip (SoC), an IC, or the like.

FIG. 1 illustrates a user equipment (UE) performing a channel state information (CSI) prediction, according to an embodiment of the disclosure.

Referring to FIG. 1, a UE 100 includes a CSI prediction controller 110, a communicator 120, memory 130, and at least one processor 140. The CSI prediction controller 110 can be connected to the memory 130 and the at least one processor 140.

The CSI prediction controller 110 is configured to receive a plurality of reference signals from a base station. The CSI prediction controller 110 is further configured to divide the frequency domain and the time domain into a plurality of sub carriers. The CSI prediction controller 110 is further configured to estimate a raw channel estimate for each subcarrier based on the reference signals. The CSI prediction controller 110 is further configured to compute using the received plurality of reference signals, a channel quality indicator (CQI) estimation for a particular interval. The CQI estimation includes computing mean mutual information per bit (MMIB) or effective exponential signal to noise ratio (SNR) mapping EESM.

In aspects of the disclosure, the particular interval refers to either a frequency domain or a time domain. In frequency domain, the particular interval is referred to as a band. When the frequency interval is a full frequency band, then the particular interval is called a wideband, and if the particular interval is for a part of the full frequency band, then the particular interval is called a sub-band. In time domain, the particular interval refers to a duration for which the CQI estimation and reporting is targeted. For example, when using a reporting periodicity of 80 ms, upon receiving the reference signals, the UE 100 will perform the estimation using the received reference signals. While doing prediction, the UE 100 uses the 80 ms reporting periodicity as a reference interval duration to come up with the CQI prediction that is a best fit.

The CSI prediction controller 110 is further configured to predict the CSI based on the computed CQI or CQI parameters. In an aspect of the disclosure, the CSI prediction controller 110 can compute CQI using mean mutual information per bit (MMIB). The CSI prediction controller 110 can compute CQI using effective exponential signal to noise ratio (SNR) mapping (EESM). The prediction of the CSI includes pre-processing, by the UE, the plurality of reference signals to at least one scale value per feature of the plurality of reference signals to a predetermined range and selecting, by the UE 100, a prediction technique for predicting the CSI based on a UE configuration. The prediction technique includes at least one regression-based machine learning (ML) model or at least one classification-based ML model. The CSI prediction controller 110 is further configured to report the CSI to the base station, if the predicted CQI is greater than the estimated CQI.

Aspects of the disclosure relates to the reporting of the CSI to the base station. The reporting includes at least one of a wideband reporting and a sub-band reporting. The wideband reporting is a single CSI for the full wideband and the sub-band reporting is a CSI reporting on a sub-band basis. The CSI prediction controller 110 is further configured to perform post-processing conversion on the MMIB or the EESM to predicted channel quality information (CQI) and determine if the predicted CQI is greater than the estimated CQI. The wideband refers to a set of subcarriers for which a common CSI or CQI is to be estimated or reported. The sub-band is a band of subcarriers for which the CSI is reported or estimated and the subcarriers are divided into sub-bands. According to aspects of the disclosure, the CSI prediction controller 110 is further configured to select a multiple-input multiple output (MIMO) rank for CSI reporting. A regression-based machine learning (ML) model and the classification based ML model predicts the CSI based on a radio resource configuration (RRC) of the UE and the CSI estimation corresponding to a measurement instance between the UE and the base station.

The CSI prediction controller 110 is further configured to report the CSI based on the predicted CQI if the predicted CQI is greater than the estimated CQI. If the predicted CQI is less than (or equal to) the estimated CQI, then the CSI prediction controller 110 is further configured to report the CSI based on the estimated CQI. For example, consider if the predicted CQI is 11, and the estimated CQI is 10, then the UE 100 will choose to use the predicted CQI value 11 during the CSI reporting. Alternatively, if the predicted CQI is 10, and the estimated CQI is 11, then the UE 100 will choose to use the estimated CQI value 11 during the CSI reporting.

The CSI prediction controller 110 also preforms channel estimation and using the channel estimation, the CSI report is provided by the BS to the UE. The ML can be a neural network, example of the neural network can be, but not limited to, dense, convolutional neural network (CNN), long short-term memory (LSTM), bidirectional long-short term memory (bi-LSTM), leaky rectified linear unit (leaky) (ReLU), and so on. The neural networks may also comprise of hidden layers with recurrent connections to exploit a temporal correlation in features, such as (MMIS), for example, recurrent neural networks (RNN), LSTM, and bi-LSTM. The activation functions are chosen during training to yield the best results, for example, ReLU, leaky ReLU, and Sigmoid.

According to aspects of the disclosure, the CSI prediction may be enabled on new radio (NR) and long term evolution (LTE) UEs with a low computation complexity. The UE 100 or the BS can use a machine learning based computationally approach for CSI prediction or channel estimation.

Further, the at least one processor 140 is configured to execute instructions stored in the memory 130 and to perform various processes. The communicator 120 is configured for communicating internally between internal hardware components and with external devices via one or more networks. The communicator 120 may be referred to as a transceiver. The memory 130 also stores instructions to be executed by the at least one processor 140. The memory 130 may include non-volatile storage elements. Examples of such non-volatile storage elements may include magnetic hard discs, optical discs, floppy discs, flash memories, or forms of electrically programmable read only memories (EPROM) or electrically erasable and programmable ROM (EEPROM) memories. In addition, the memory 130 may, in some examples, be considered a non-transitory storage medium. The term "non-transitory" may indicate that the storage medium is not embodied in a carrier wave or a propagated signal. However, the term "non-transitory" should not be interpreted that the memory 130 is non-movable. In certain examples, a non-transitory storage medium may store data that can, over time, change (e.g., in random access memory (RAM) or cache).

At least one of the plurality of modules may be implemented through an artificial intelligence (AI) model. A function associated with the AI model may be performed through the non-volatile memory, the volatile memory, and the at least one processor 140. The at least one processor 140 may include one or a plurality of processors. At this time, one or a plurality of processors may be a general-purpose processor, such as a central processing unit (CPU), an application processor (AP), or the like, a graphics-only processing unit, such as a graphics processing unit (GPU), a visual processing unit (VPU), and/or an AI-dedicated processor, such as a neural processing unit (NPU).

The operations of the CSI prediction controller 110 may be executed through the at least one processor 140.

The one or a plurality of processors control the processing of the input data in accordance with a predefined operating rule or the AI model stored in the non-volatile memory and the volatile memory. The predefined operating rule or artificial intelligence model can be provided through training or learning.

Here, being provided through learning means that a predefined operating rule or AI model of a desired characteristic is made by applying a learning algorithm to a plurality of learning data. The learning may be performed in a device itself in which AI according to an aspect of the disclosure is performed, and/or may be implemented through a separate server/system.

Although the FIG. 1 shows various hardware components of the UE 100 but it is to be understood that other aspects of the disclosure are not limited thereon. In other aspects of the disclosure, the UE 100 may include less or a greater number of components. Further, the labels or names of the components are used only for illustrative purpose and does not limit the scope of the disclosure. One or more components can be combined together to perform same or substantially similar function in the UE 100.

The BS may comprise a CSI prediction controller, a communicator, memory and at least one processor, similarly to the UE 100. The operations of the CSI prediction controller of the BS may be performed through the at least one processor of the BS. The operations of the BS described herein may be performed by the at least one processor of the BS. The memory of the BS may store instructions, which when executed by the at least one processor of the BS, cause the BS or the at least one processor to perform the operations of the BS described herein.

Figure 2:
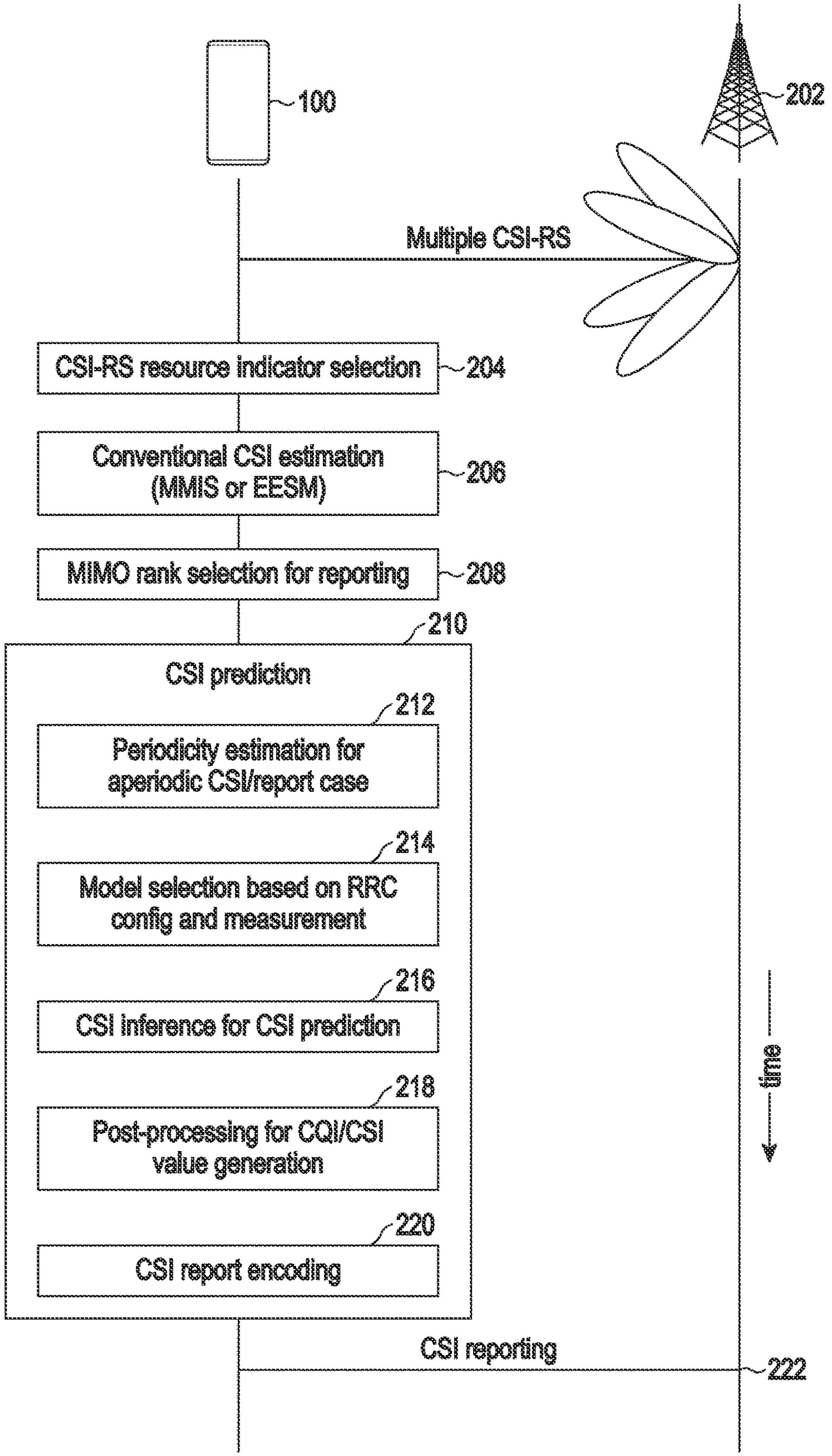
FIG. 2 illustrates a procedure for reporting CSI between a UE and a base station (BS) according to an embodiment of the disclosure.

FIG. 2 illustrates a procedure for reporting CSI between a UE and a base station (BS) according to an embodiment of the disclosure.

Referring to FIG. 2, at operation 204, the procedure includes selection of CSI-RS resource indicator. At operation 206, the procedure includes performing, by the UE 100, a CSI estimation of the related art. At operation 208, the procedure includes selecting MIMO rank selection of the CSI estimation for CSI reporting. The selection of CSI-RS resource indicator and the selection MIMO rank selection further includes estimating, by the UE 100, a supported channel capacity by each of the CSI-RS resource and supported rank values, and choosing, by the UE 100, a corresponding indicator and rank combination which maximizes the channel capacity for the UE 100.

At operation 210, the procedure includes performing CSI prediction by periodicity estimating, an aperiodic CSI (operation 212), selecting a model based on RRC configuration and measurement (operation 214), detecting CSI inference for CSI prediction (operation 216), post processing generated CQI or CSI value (operation 218), and encoding the CSI report (operation 220). At operation 222, the procedure includes reporting the CSI to the BS 202. For aperiodic triggers, multiple approximation techniques can be used by the UE 100 to determine a best fit reporting periodicity for the CSI prediction. For example, the UE 100 may choose the value that minimizes mean square error for a time duration between successive aperiodic triggers based on the most recent M events, where M is predefined.

The gNB configures and transmits multiple CSI-RS to the UE 100 for CSI measurement. Based on the RRC configuration, periodicity estimation can be performed when either CSI-RS or reporting is of aperiodic type. Further based on the RRC configuration and CSI estimation (CRI, rank), module selection can be performed to be used for prediction.

Figure 3:
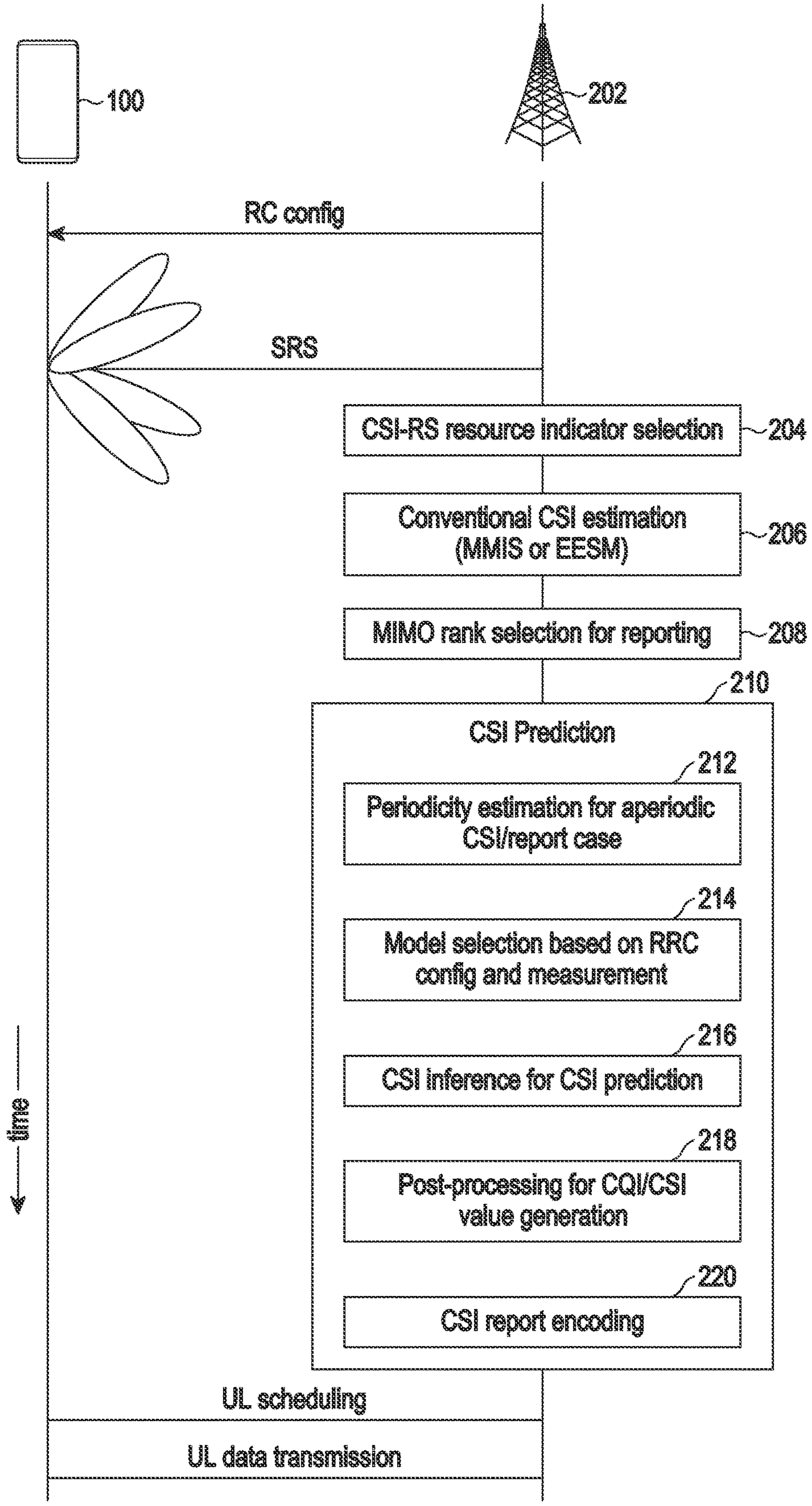
FIG. 3 illustrates a procedure for CSI prediction operation at a BS for a UE according to an embodiment of the disclosure.

FIG. 3 illustrates a procedure for CSI prediction operation at a BS for a UE according to an embodiment of the disclosure.

Referring to FIG. 3, at operation 204, the procedure includes selection of a channel state information reference signal (CSI-RS) resource indicator. At operation 206, the procedure includes performing, by the gNB a CSI estimation of the related art. At operation 208, the procedure includes performing MIMO rank selection of the CSI estimation for CSI reporting. The selection of CSI-RS resource indicator and the selection MIMO rank selection further includes estimating, by the gNB, a supported channel capacity by each of the CSI-RS resource and supported rank values, and choosing, by the gNB, a corresponding indicator and rank combination which maximizes the channel capacity for the gNB.

At operation 210, the procedure includes performing CSI prediction by periodicity estimating, an aperiodic CSI (operation 212), selecting a model based on RRC configuration and measurement (operation 214), detecting CSI inference for CSI prediction (operation 216), post processing generated CQI or CSI value (operation 218), and encoding the CSI report (operation 220).

The procedure further includes reporting the CSI to the UE 100. For aperiodic triggers, multiple approximation techniques can be used by the gNB to determine a best fit reporting periodicity for the CSI prediction. For example, the gNB may choose the value that minimizes mean square error for a time duration between successive aperiodic triggers based on the most recent M events, where M is predefined.

Figure 4:
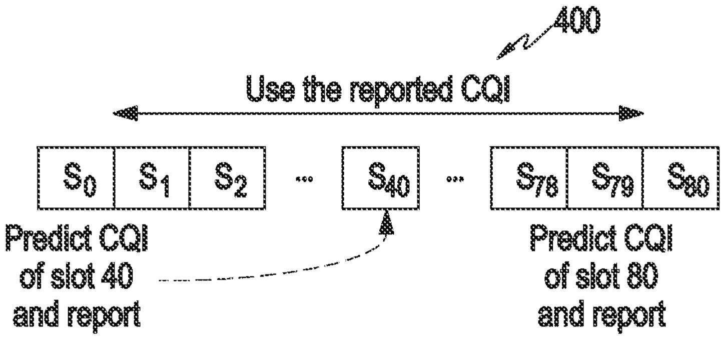
FIG. 4 illustrates a CSI prediction for a future $i^{th}$ slot (i=40 for example) in an interval using a most recent measurement according to an embodiment of the disclosure.

FIG. 4 illustrates a CSI prediction 400 for a future $i^{th}$ slot (i=40 for example) in an interval using a most recent measurement according to an embodiment of the disclosure.

Referring to FIG. 4, for example, consider a periodic CSI reporting for the interval of the $80^{th}$ slot, the CSI prediction is performed at every $40^{th}$ slot to eliminate errors (if any). The UE 100 considers the most recent M channel estimates, where M is predefined. The UE 100 uses a machine learning model to predict the future channel estimate in time. Once the ML prediction is performed on channel estimates corresponding to each resource to be used for CSI reporting, the UE 100 process to the CSI or CQI is generation based on MMIS or EESM methods of the related art.

Figure 5:
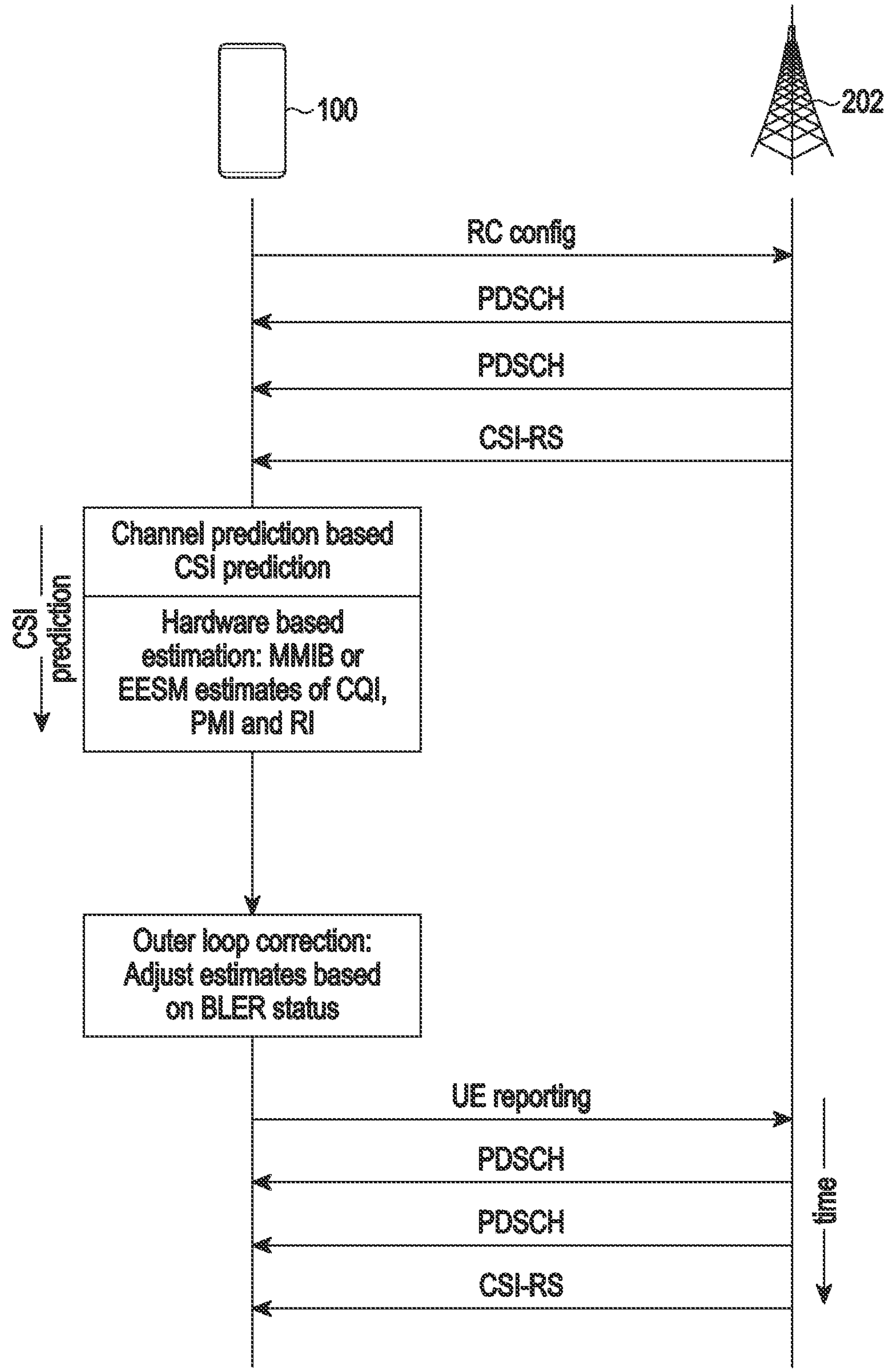
FIG. 5 illustrates a channel prediction-based CSI prediction according to an embodiment of the disclosure.

FIG. 5 illustrates channel prediction-based CSI prediction according to an embodiment of the disclosure.

Referring to FIG. 5, ° CSI prediction is performed for the channel estimates, prior to CSI estimation operation. The complexity of prediction increases proportional to the MIMO transmission rank and bandwidth.

Figure 6:
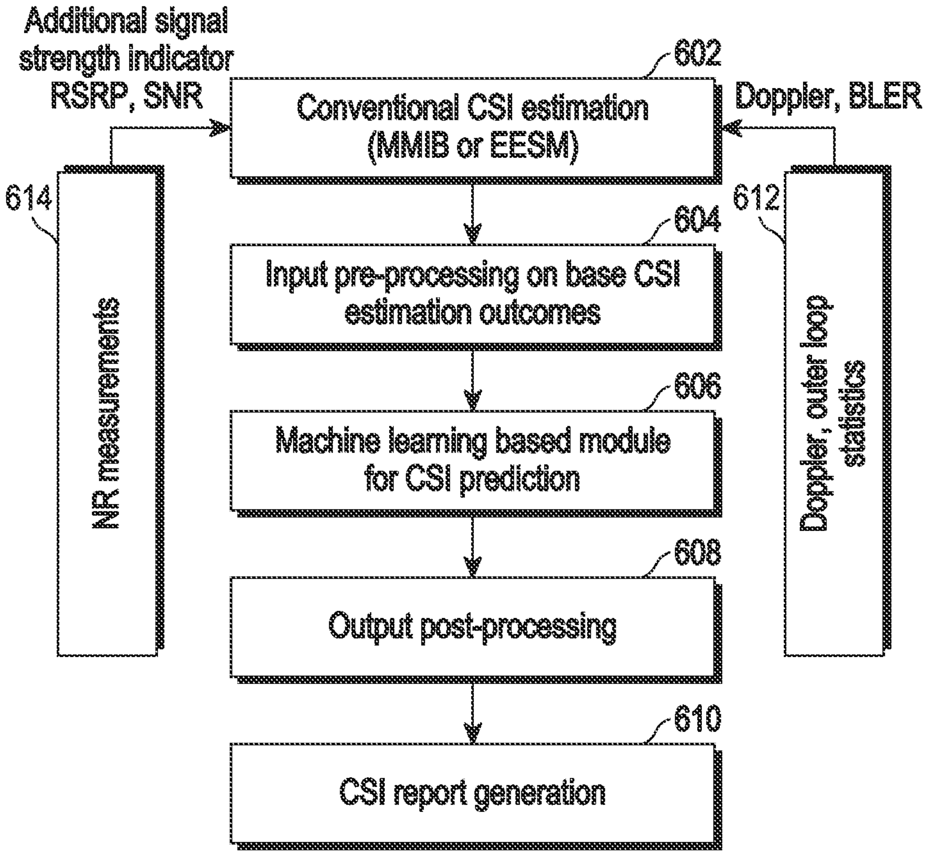
FIG. 6 illustrates an architecture of a CSI according to an embodiment of the disclosure.

FIG. 6 illustrates an architecture of a CSI according to an embodiment of the disclosure.

Referring to FIG. 6, at operation 602, the CSI performs CSI estimation (MMIB or EESM) of the related art. The ML module is pre-trained to perform the CSI prediction using the MMIB (M), capacity © and SINR(S) estimates from the most recent N measurements, where N is predefined or dynamically computed by the UE as a function of measurement and the CSI reporting periodicity. The M, C and S input vectors are pre-processed appropriately before being used for prediction by the ML model. The output from the ML module undergoes a post-processing which generates the predicted CSI. In the case of EESM, the MMIB term is replaced with EESM SINR computed by the EESM module.

At operation 604, input pre-processing is performed on the base CSI estimation outcome. Each input feature and scale values per feature is pre-processed to a predetermined range. Parameters in input block are determined during training based on the input value range of the features and during hyperparameter tuning of the ML model to optimize performance. For example, consider standard scaling for an input vector v_i could be performed as: standard scaling Equation 1

$$\hat{v}_i = v_i/(\max_i v_i - \min_i v_i) \quad \text{Equation 1}$$

and MinMax scaling (Equation 2) per input vector could be performed as $$\hat{v}_i(v_i - E[v_i])/\text{variance}(v_i) \quad \text{Equation 2}$$

At operation 606, machine learning (ML) based CSI prediction is performed.

At operation 608, the CSI estimation is post processed.

At operation 610, the CSI report is generated. At operation 612, the procedure includes Doppler, outer loop statistics. At operation 614, the procedure includes NR measurements. The ML based CSI prediction includes a neural network. The neural network includes input layer, an output layer and hidden layers each configured with an activation function. The neural network consists of only feed forward connections, such as dense and CNN. The hidden layers include recurrent connections to exploit a temporal correlation in the input features, such as MMIS, for example the recurrent connections are achieved through RNN, LSTM, or bi-LSTM. The activation functions are chosen during training to yield a best CSI prediction. The activation functions can be achieved through softmax, tanh, ReLU, leaky ReLU, and Sigmoid.

The post-processing is preformed using two approaches. The two approaches include regression based ML models and classification based ML models. In the regression based ML models, the output post-processing block converts the predicted MMIS to the CQI using a look-up table based approach. Further, the look-up table may be predefined or generated in run-time based on a downlink BLER statistics. In the post-processing for classification based ML models the ML module generates an output vector of size 16 corresponding to each CQI. The post-processing block represents a softmax operation. The post-processing module may favor reporting the estimated CQI over the predicted CQI based on a confidence measure. For example, the post processing block may allow only positive CQI corrections by the prediction algorithm, i.e., only if predicted CQI is greater than the estimated CQI, then the predicted CQI will be used for CSI reporting FIG. 7 illustrates a CSI procedure for MMIB architecture according to an embodiment of the disclosure.

Figure 7:
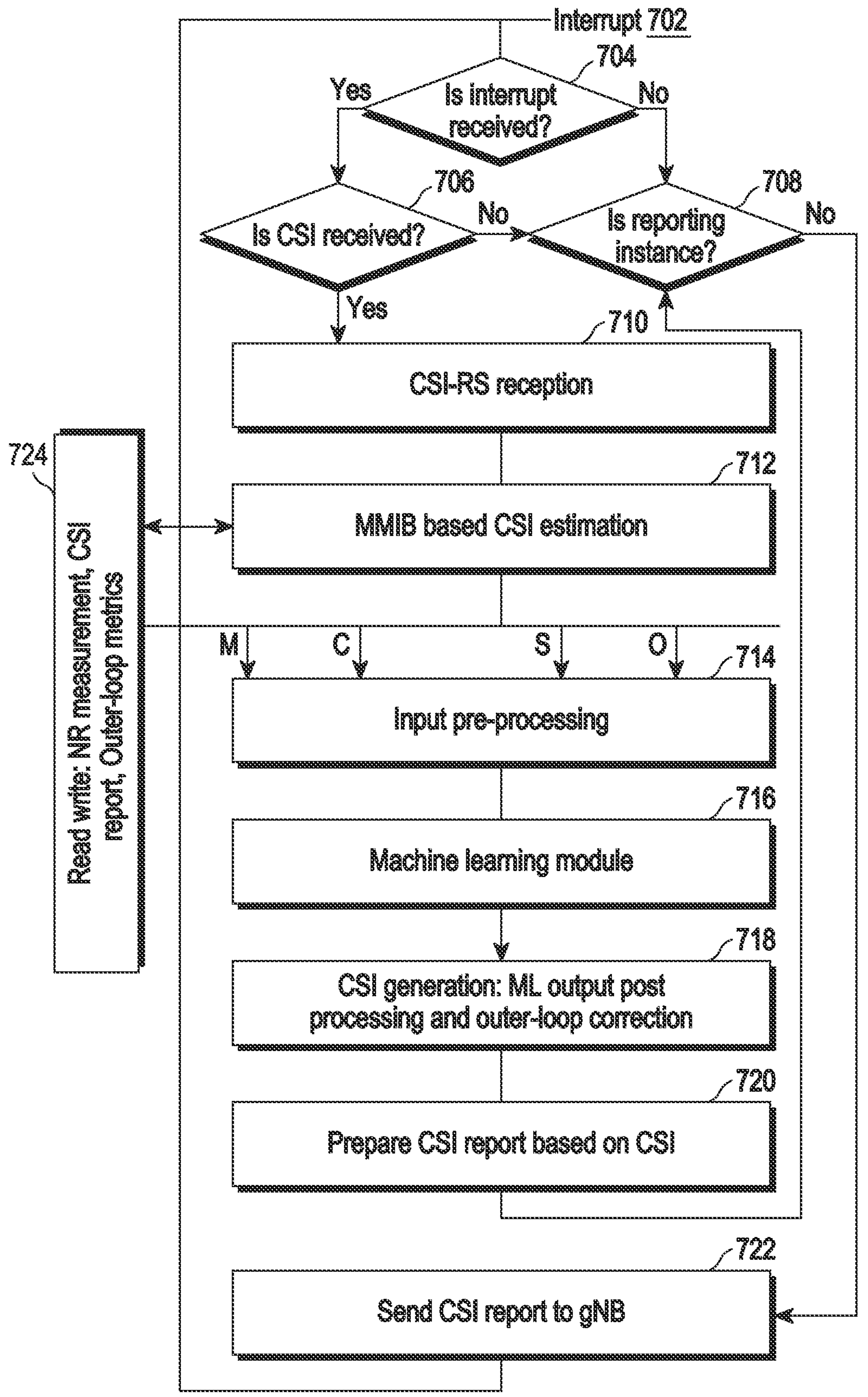
FIG. 7 illustrates a CSI for a mean mutual information per bit (MMIB) architecture according to an embodiment of the disclosure.

Referring to FIG. 7, at operation 702, the UE 100 sends an interruption to the BS 202.

At operation 704, the procedure includes checking by the BS 202 if the interrupt has been received.

At operation 706, the procedure includes checking by the UE 100, if the CSI is received.

At operation 708, the procedure includes checking by the UE 100, if the CSI estimation is for this particular instance.

At operation 712, the procedure includes performing MMIB based CSI estimation. The MMIB based CSI estimation provides up to three outputs after CSI estimation.

At operation 718, the CSI is generated for ML output post processing and outer-loop correction.

At operation 720, the CSI report is prepared based on the generated CSI.

At operation 722, the CSI report is sent to the gNB. The machine learning module is pre-trained to perform CSI prediction using the most recent MMIB (M), capacity (C) and SINR(S) estimates. The M, C and S input vectors are pre-processed before being used for prediction by the ML model. The output from the ML module undergoes post-processing to generate the predicted CSI. At operation 724, the procedure includes Read write: NR measurements, CSI report, outer-loop metrics.

The ML model and output pre-processing may use data from an outer-loop module. In the case of EESM, the MMIB term is replaced with EESM SINR, as computed by the EESM module. In regression based ML models, the look up table is maintained at the UE 100. The look up table is dynamically updated based on the BLER performance. The look up table contains a mapping information from the MMIS or EESM value to the CQI. After prediction of the MMIS or EESM, the UE 100 performs the operation CQI_predicted=LUT (MMIS_predicted) to convert the MMIS to a respective CQI value based on the look up table.

In the classification based technique, for example consider a 16 softmax values are output by the ML model, corresponding to the selection probabilities of 16 CQIs. The CQI with the maximum softmax value among the 16 is chosen as the predicted CQI.

Figure 8:
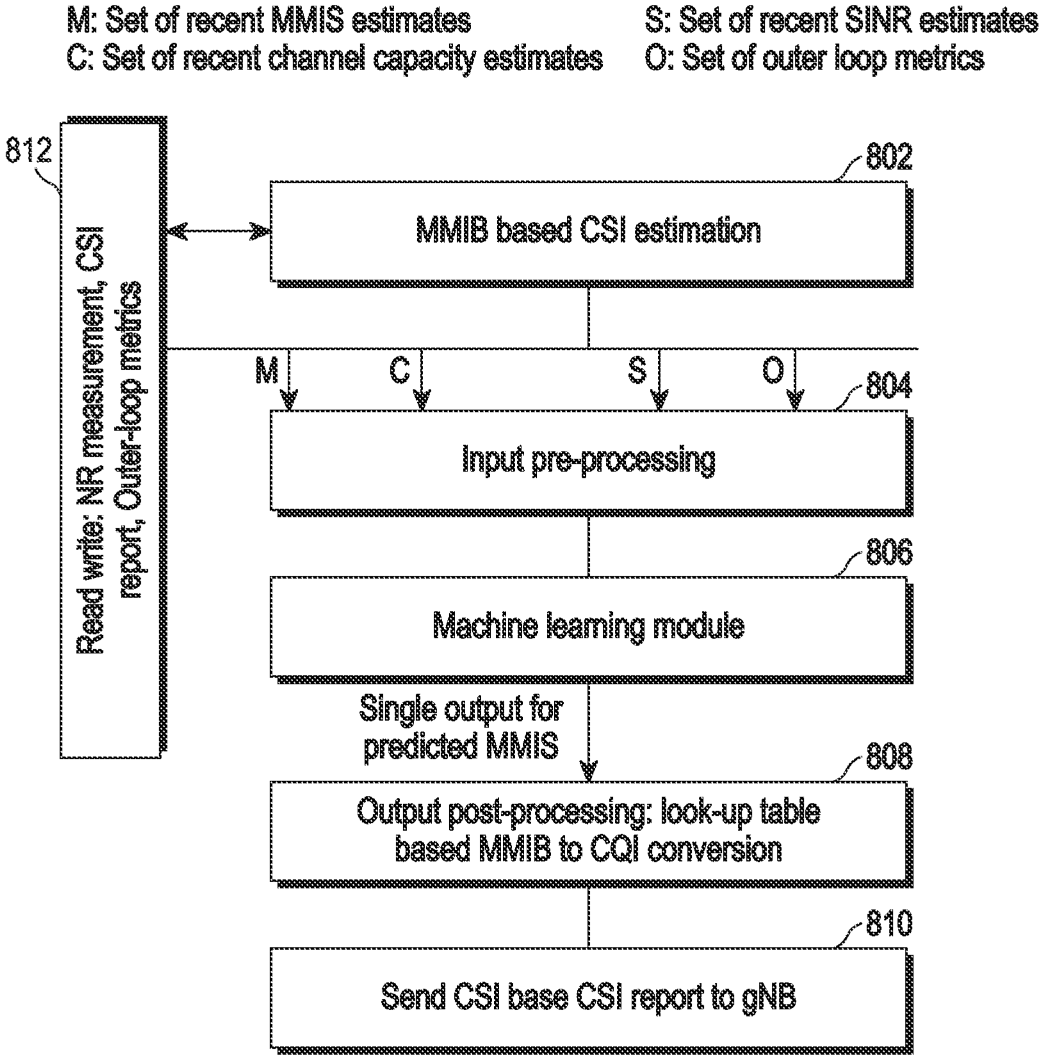
FIG. 8 illustrates an output pre-processing prediction for a single output using a regression-based approach according to an embodiment of the disclosure.

FIG. 8 illustrates an output pre-processing prediction for a single output using a regression-based approach according to an embodiment of the disclosure.

Referring to FIG. 8, the ML module predicts the future MMIS. The output post-processing block converts the predicted MMIS to a CQI using a look-up table-based approach. Further, the look-up table may be predefined or generated in run-time based on a downlink BLER statistics.

At operation 802, the MMIB based CSI estimation is performed.

At operation 804, the M, C, S, and O input vectors are pre-processed.

At operation 806, an appropriate ML model is chosen.

At operation 808, the output is pre-processed using the look-up table.

At operation 810, the CSI report is sent to the gNB. A sample format LUT={(lower_bound, higher_bound): CQI}, For example consider the LUT={(0,499): 0, (500,999): 1, (1000,1499): 2, . . . ,}, Consider a predicted instance where the predicted MMIS is 1300. Based on the above LUT, the CQI for reporting is determined as 2. At operation 812, the procedure includes Read write: NR measurements, CSI report, outer-loop metrics.

Figure 9:
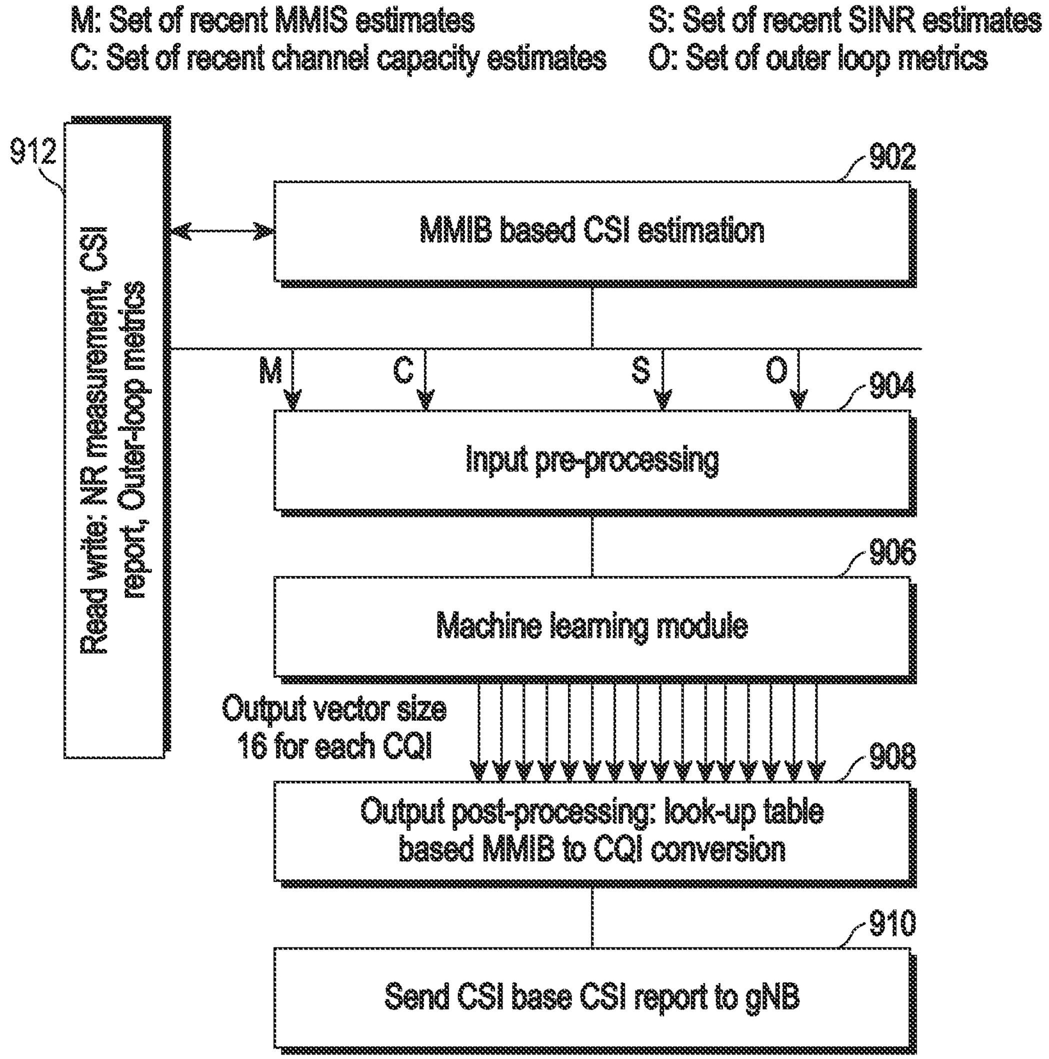
FIG. 9 illustrates an output pre-processing prediction for an output vector of 16 using a classification-based approach according to an embodiment of the disclosure.

FIG. 9 illustrates an output pre-processing prediction for an output vector of 16 using a classification-based approach according to an embodiment of the disclosure.

Referring to FIG. 9, at operation 902, the MMIB based CSI estimation is performed.

At operation 904, the M, C, S, and O input vectors are pre-processed.

At operation 906, an appropriate ML model is chosen.

At operation 908, the output is pre-processed using the look-up table.

At operation 910, the CSI report is sent to the gNB. For the classification case, an example output of the ML model is as follows: ML_output={0.1, 0.001, . . . ,0.6, . . . ,0.02}, such that the length of ML_output vector is 16. Further, first entry in the list corresponds to CQI0, second entry in the list corresponds to CQI1, and so on. Let 0.6 corresponding to CQI 10, denote the maximum value in the ML_output table. In the classification approach, based on the maximum value selection, CQI 10 is chosen as the predicted CQI to be reported. At operation 912, the procedure includes Read write: NR measurements, CSI report, outer-loop metrics.

Figure 10A:
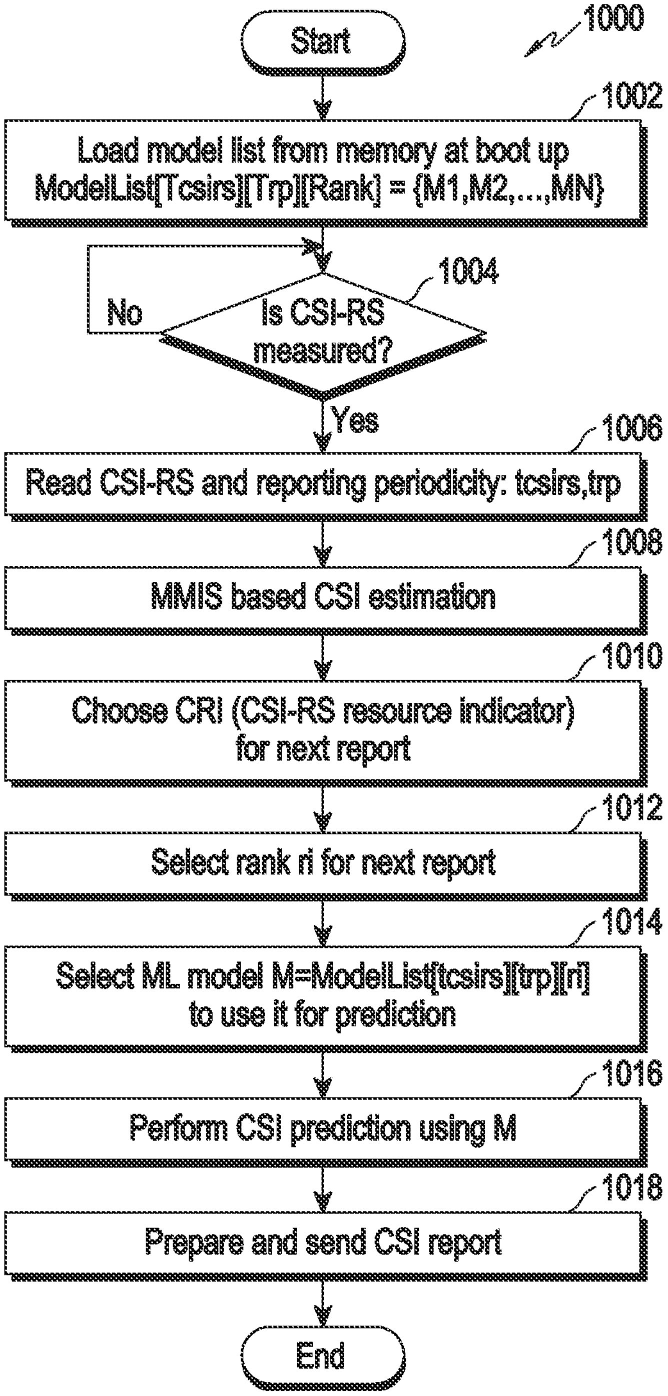
FIG. 10A illustrates a procedure in a CSI for MMIB architecture according to an embodiment of the disclosure.

FIG. 10A illustrates a procedure 1000 in a CSI for MMIS architecture according to an embodiment of the disclosure.

Referring to FIG. 10A, at operation 1002, the model list from is loaded from the memory.

At operation 1004, a check is performed if the CSI-RS has been measured. If the CSI-RS has been measured, at operation 1006, the CSI-RS and periodicity report are read.

At operation 1008, MMIS based CSI estimation is performed.

At operation 1012, CRI is chosen for the next report.

At operation 1012, a rank $r_i$ is selected for the next report.

At operation 1014, the ML approach is selected.

At operation 1016, CSI prediction is performed using vector M.

At operation 1018, the CSI report is prepared and send to the BS 202. The various actions in method 1000 may be performed in the order presented, in a different order or simultaneously. Further, in some embodiments of the disclosure, some actions listed in FIG. 10A may be omitted.

Figure 10B:
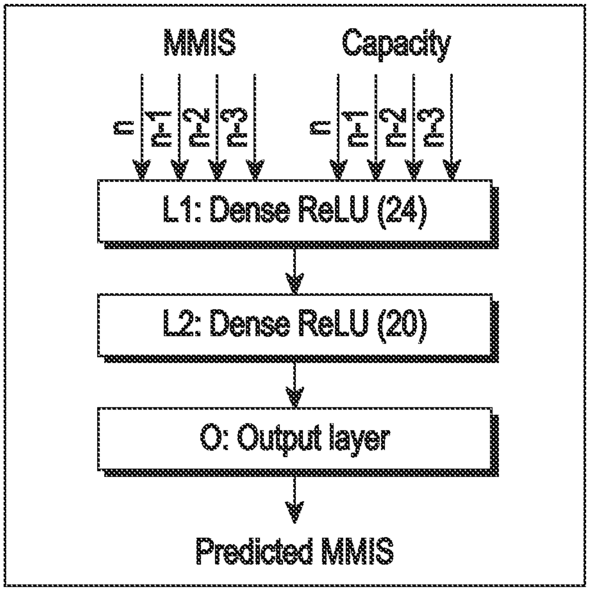
FIGS. 10B and 10C illustrate a procedure used in a CSI for an MMIB architecture for Trp of 80 slots and Top of 160 slots according to various embodiments of the disclosure.
Figure 10C:
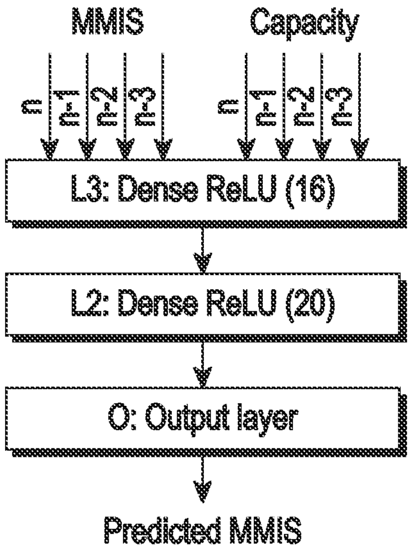

FIGS. 10B and 10C illustrates a procedure used in a CSI for an MMIB architecture for $T_{rp}$ of 80 slots and $T_{rp}$ of 160 slots according to various embodiments of the disclosure.

Referring to FIG. 10B, consider an example when the UE 100 detects the $T_{rp}$ with 80 slots, and based on the ModelList, the UE 100 selects an appropriate m80.h5 model consisting of the ML model architecture for the CSI prediction. Now the ModelList [$T_{csirs}$] [$T_{rp}$] [ri]=ModelList [$T_{csirs}$] [80] [ri]=location of m80.h5

Referring to FIG. 10C, consider an example when the UE 100 detects the $T_{rp}$ with 160 slots, and based on the ModelList, the UE 100 selects an appropriate m160.h5 model consisting of the ML model architecture for the CSI prediction. Now the ModelList [$T_{csirs}$] [$T_{rp}$] [ri]=ModelList [$T_{csirs}$] [160] [ri]=location of m160.h5

Figure 11:
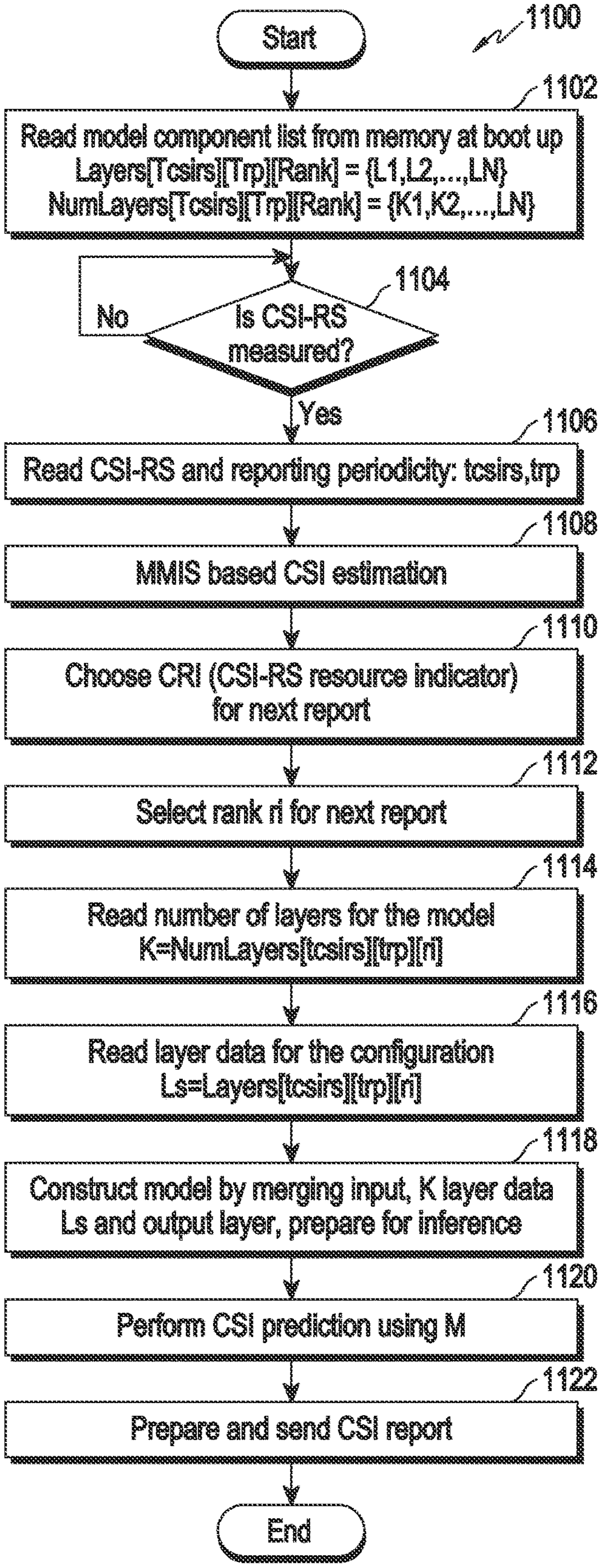
FIG. 11 illustrates a procedure for selecting a model from stored components according to an embodiment of the disclosure.

FIG. 11 illustrates a procedure 1100 for selecting a model from stored components according to an embodiment of the disclosure.

Referring to FIG. 11, at operation 1102, the model components are read from the memory.

At operation 1104, a check is performed if the CSI-RS has been measured. If the CSI-RS has not been measured, at operation 1106, the CSI-RS and periodicity report are read.

At operation 1108, the MMIS based CSI estimation are performed.

At operation 1110, the CRI for the next report is chosen.

At operation 1112, rank $r_i$ for the next report is selected.

At operation 1114, the number of layers for the model are read.

At operation 1116, the layer data for the configuration is read.

At operation 1118, the model is constructed by merging input, k the layer data $L_s$ and the output layer.

At operation 1120, CSI prediction is performed using vector M.

At operation 1122, the CSI report is prepared and send to the BS 202. The various actions in method 1100 may be performed in the order presented, in a different order or simultaneously. Further, in some aspects of the disclosure, some actions listed in FIG. 11 may be omitted. The two methods for model storage: construction of a model from the stored model components. For example, consider the approach, model construction from the list ModelList [$T_{csirs}$] [$T_{rp}$] [ri], where variations are $T_{rp}$=80 and $T_{rp}$=160. The network for $T_{rp}$=80 slots, denoted as m80.h5 and the network for Trp=160 slots, denoted as m160.h5. The individual layer components L1, L2, L3 and O are stored in the UE memory as h5 files. For 80 slots operation, the ModelList entry is:

ModelList [$T_{csirs}$] [80] [ri].k=3

ModelList [$T_{csirs}$] [80] [ri].$L_s$= [L1,L2,0]

For 160 slots operation, the ModelList entry is:

ModelList [$T_{csirs}$] [80] [ri].k=3

ModelList [$T_{csirs}$] [80] [ri].$L_s$= [L1,L2,0]

When the UE 100 detects the $T_{rp}$ is 80 or 160 slots, based on the ModelList, then the UE 100 selects and chains the appropriate layers to construct the model and uses the model for prediction.

Figure 12:
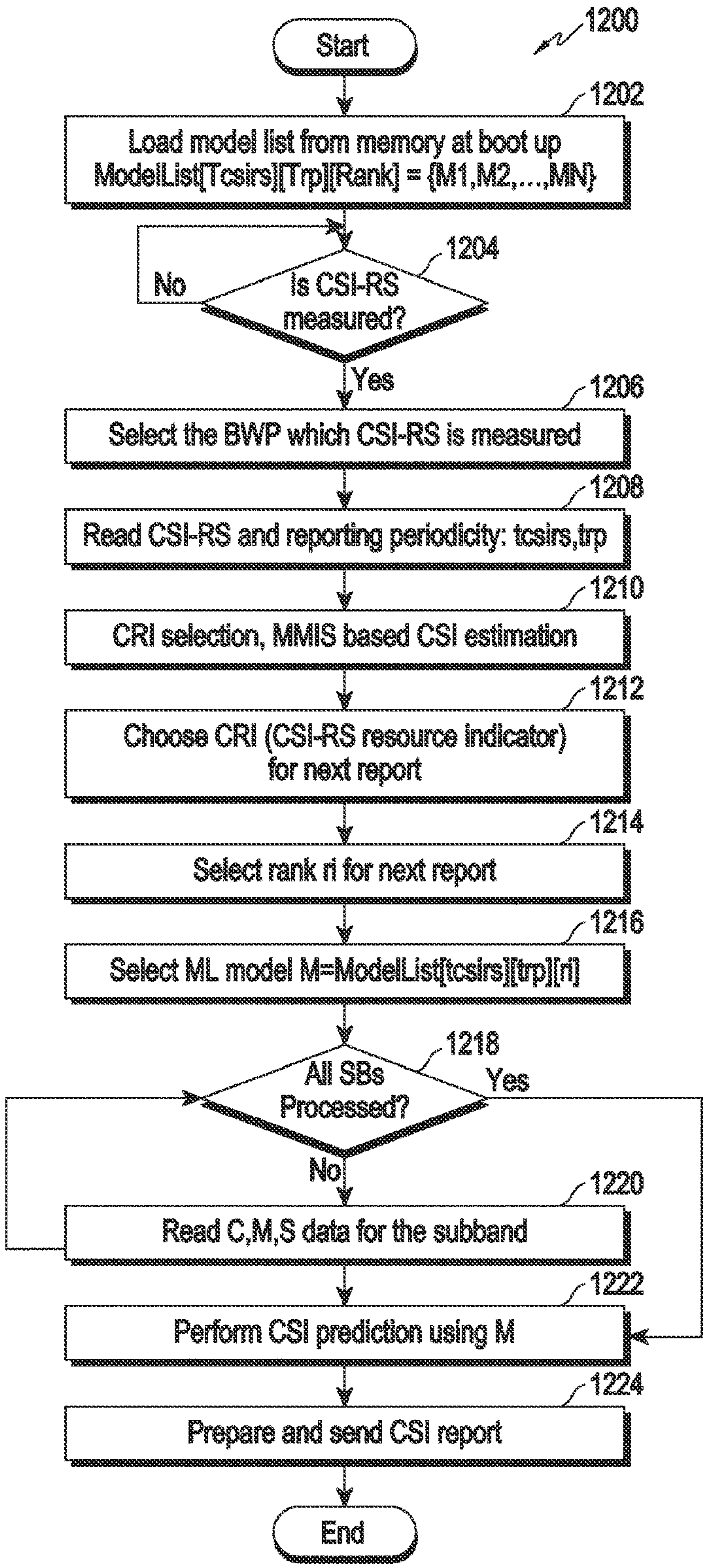
FIG. 12 illustrates a CSI supporting multiple bandwidth parts according to an embodiment of the disclosure.

FIG. 12 illustrates a CSI to supporting multiple bandwidth parts 1200 according to an embodiment of the disclosure.

Referring to FIG. 12, at operation 1202, the model list is loaded from the memory.

At operation 1204, a performed to check if the CSI-RS has been measured. If the CSI-RS has not been measured, at operation 1206, a bandwidth part (BWP), for which CSI-RS has been measured, is selected.

At operation 1208, the CSI-RS and reporting periodicity: tcsirs, trp are read.

At operation 1210, CRI selection and MMIS based CSI estimation are performed.

At operation 1212, the CRI (CSI-RS resource indicator) for the next report is chosen.

At operation 1214, rank ri for the next report is chosen.

At operation 1216, the ML model M=ModelList [tcsirs] [trp] [ri].

At operation 1218, a check is made if all the SBs have been processed. If all the SBs have not been processed, at operation 1220, C, M, S data for the sub-band is read.

At operation 1222, CSI prediction is performed using M.

At operation 1224, the CSI report is prepared and send to BS 202. The various actions in method 1200 may be performed in the order presented, in a different order or simultaneously. Further, in some aspects of the disclosure, some actions listed in FIG. 12 may be omitted.

Figure 13:
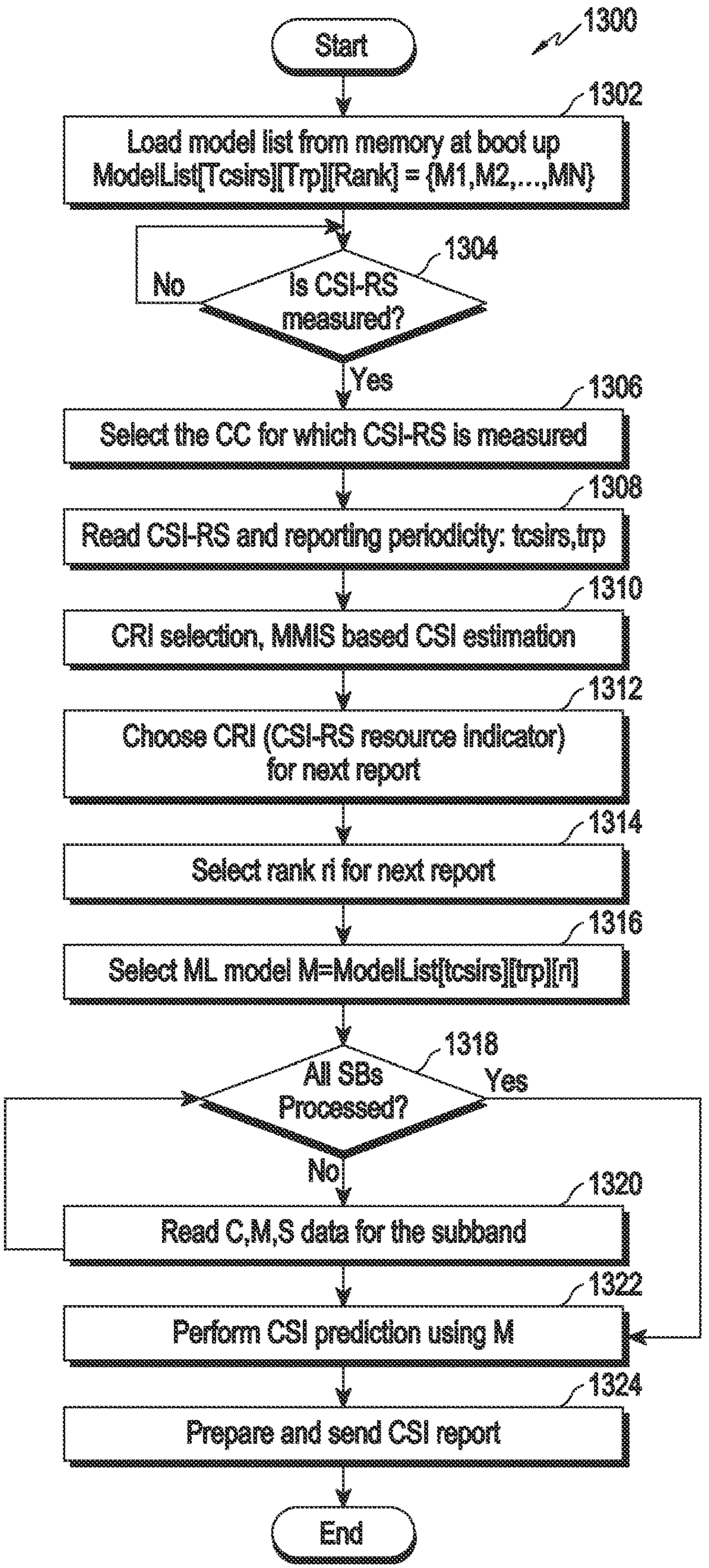
FIG. 13 illustrates a CSI supporting multiple carrier aggregation according to an embodiment of the disclosure.

FIG. 13 illustrates a CSI supporting multiple carrier aggregation 1300 according to an embodiment of the disclosure.

Referring to FIG. 13, at operation 1302, the model list is loaded from the memory.

At operation 1304, a check is made if the CSI-RS has been measured. If the CSI-RS has not been measured, at operation 1306, the CC for which CSI-RS has been measured is selected.

At operation 1308, the CSI-RS and reporting periodicity: tcsirs, trp are read.

At operation 1310, CRI selection, and MMIS based CSI estimation are being performed.

At operation 1312, the CRI (CSI-RS resource indicator) for next report is selected.

At operation 1314, the rank ri for the next report is selected.

At operation 1316, the ML model M=ModelList [tcsirs] [trp] [ri] is selected.

At operation 1318, a check is made if all the SBs have been processed. If all the SBs have not been processed, at operation 1320, C, M, S data for the sub-band are read.

At operation 1322, CSI prediction is performed using M.

At operation 1324, the CSI report is prepared and send to the BS 202. The various actions in method 1300 may be performed in the order presented, in a different order or simultaneously. Further, in some aspects of the disclosure, some actions listed in FIG. 13 may be omitted.

Figure 14:
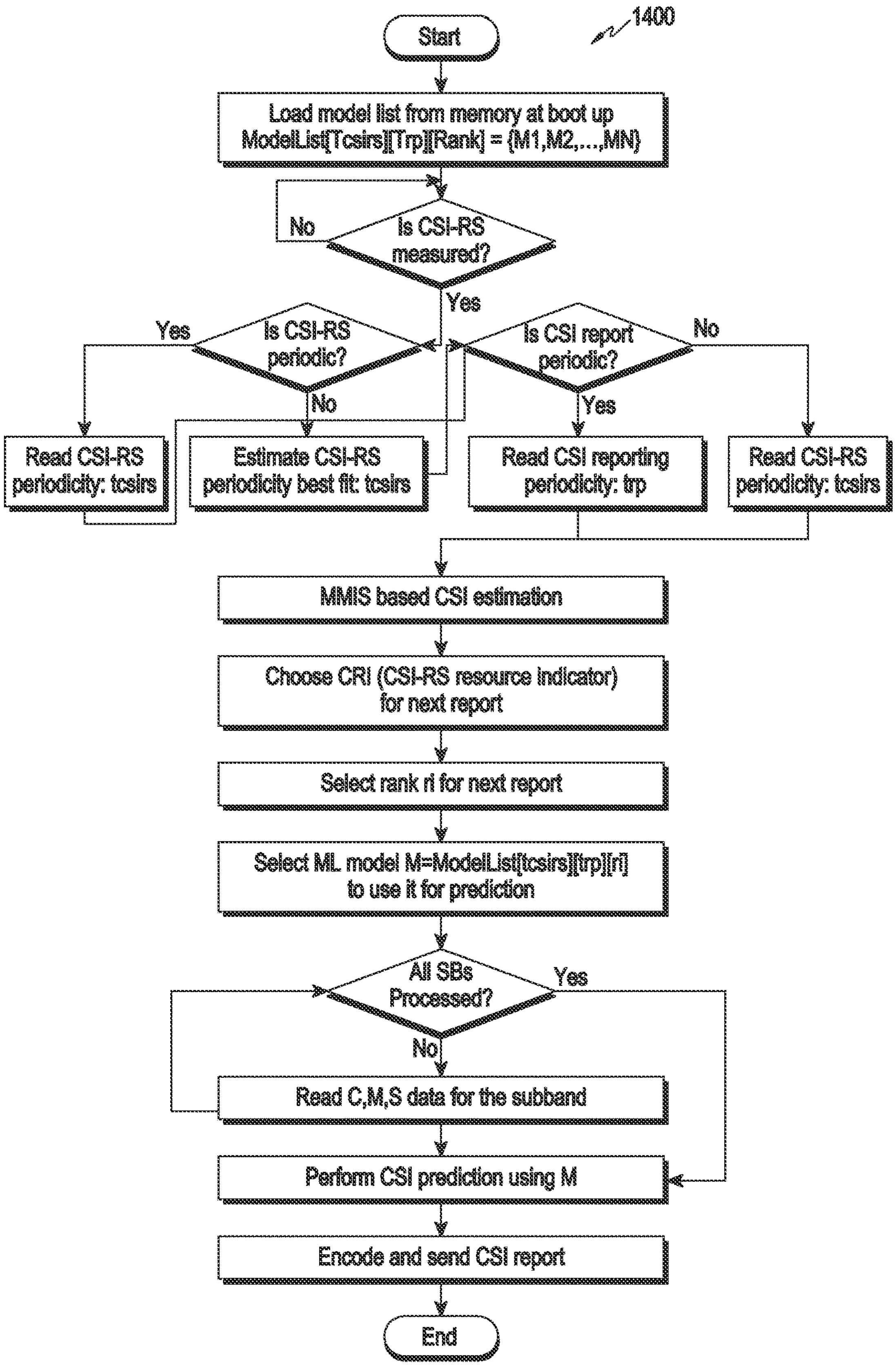
FIG. 14 illustrates a CSI with periodicity estimation according to an embodiment of the disclosure.

FIG. 14 illustrates a CSI with periodicity estimation 1400 according to an embodiment of the disclosure.

Referring to FIG. 14, for aperiodic triggers, multiple approximation techniques can be used by the UE 100 to determine a best fit reporting periodicity for the CSI prediction. For example, the UE 100 may choose the value that minimizes mean square error for a time duration between successive aperiodic triggers based on the most recent M events, where M is predefined.

Figure 15:
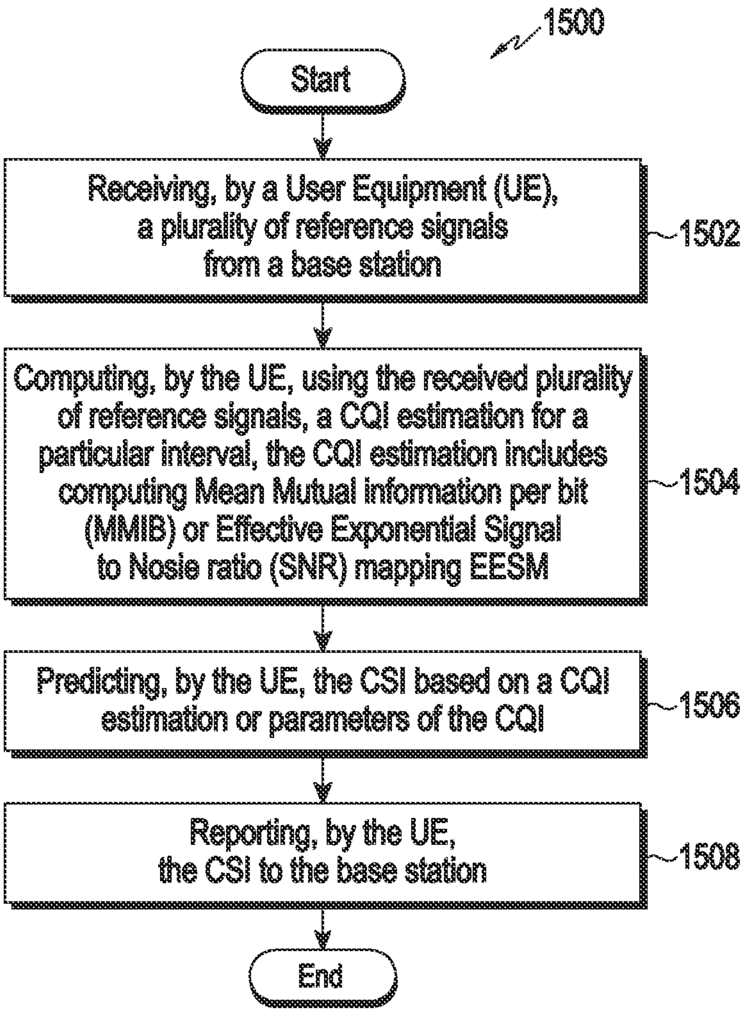
FIG. 15 illustrates a method for performing a channel state information (CSI) prediction according to an embodiment of the disclosure.

FIG. 15 illustrates a method 1500 for performing a channel state information (CSI) prediction according to an embodiment of the disclosure.

Referring to FIG. 15, at operation 1502, the method 1500 includes receiving, by the UE 100, a plurality of reference signals from a base station.

At operation 1504, the method 1500 includes computing, by the UE 100, CQI estimation for a particular interval, wherein CQI estimation includes computing mean mutual information per bit (MMIB) or effective exponential signal to noise ratio (SNR) mapping EESM.

At operation 1506, the method 1500 further includes predicting, by the UE, the CSI based on a CQI estimation or parameters of the CQI. The CQI is computed using mean mutual information per bit (MMIB) or effective exponential signal to noise ratio (SNR) mapping (EESM).

At operation 1508, the method 1500 further includes reporting, by the UE, the CSI to the base station. The various actions in method 1500 may be performed in the order presented, in a different order or simultaneously. Further, in some aspects of the disclosure, some actions listed in FIG. 15 may be omitted.

The aspects of the disclosure can be implemented through at least one software program running on at least one hardware device and performing network management functions to control the elements. The elements can be at least one of a hardware device, or a combination of hardware device and software module.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a user equipment (UE), the method comprising:
- receiving a plurality of reference signals from a base station;
- estimating channel quality information (CQI) for an interval based on the plurality of reference signals, wherein estimating the CQI comprises obtaining at least one of mean mutual information per bit (MMIB) or effective exponential signal to noise ratio mapping (EESM);
- predicting channel state information (CSI) based on the estimated CQI;
- performing post-processing conversion of the MMIB or the EESM to predict CQI;
- determining whether the predicted CQI is greater than the estimated CQI;
- reporting, to the base station, CSI based on the predicted COI in case that the predicted CQI is greater than the estimated CQI; and
- reporting, to the base station, the CSI predicted based on the estimated CQI in case that the predicted COI is less than or equal to the estimated CQI.

2. The method of claim 1, wherein the reporting of the predicted CSI to the base station comprises:
- at least one of a wideband reporting and a sub-band reporting.

3. The method of claim 2, wherein the wideband reporting is a single CSI reporting for a full wideband and the sub-band reporting is a CSI reporting on a sub-band.

4. The method of claim 1, wherein the predicted CSI is reported using one of a periodic CSI reporting, an aperiodic CSI reporting, or combination of the periodic CSI reporting and the aperiodic CSI reporting.

5. The method of claim 1, further comprising:
- selecting a multiple-input multiple output (MIMO) rank for CSI reporting.

6. The method of claim 1, wherein at least one of a regression-based machine learning (ML) model or a classification-based ML model is used to predict the CSI based on a radio resource configuration (RRC) of the UE and the estimated CQI corresponding to a measurement instance between the UE and the base station.

7. The method of claim 1, wherein at least one of a regression-based machine learning (ML) model or a classification-based ML model is used to perform the post-processing conversion of the MMIB or the EESM to the predicted CQI.

8. A user equipment (UE) comprising:
- memory; and
- one or more processors coupled to the memory,
- wherein the memory store one or more computer programs including computer-executable instructions that, when executed by the one or more processors individually or collectively, cause the UE to:
  - receive a plurality of reference signals from a base station,
  - estimate channel quality information (CQI) for an interval based on the plurality of reference signals, wherein estimating the CQI comprises obtaining at least one of mean mutual information per bit (MMIB) or effective exponential signal to noise ratio mapping (EESM), predict channel state information (CSI) based on the estimated CQI, perform post-processing conversion of the MMIB or the EESM to predict CQI, determine whether the predicted CQI is greater than the estimated CQI, report, to the base station, CSI based on the predicted CQI in case that the predicted COI is greater than the estimated CQI, and report, to the base station, the CSI predicted based on the estimated CQI in case that the predicted COI is less than or equal to the estimated COI.

9. The UE of claim 8, wherein the reporting of the predicted CSI to the base station comprises:

at least one of a wideband reporting and a sub-band reporting.

10. The UE of claim 9, wherein the wideband reporting is a single CSI reporting for a full wideband and the sub-band reporting is a CSI reporting on a sub-band.

11. The UE of claim 8, wherein the predicted CSI is reported using one of a periodic CSI reporting, an aperiodic CSI reporting, or combination of the periodic CSI reporting and the aperiodic CSI reporting.

12. The UE of claim 8, wherein the one or more computer programs further include computer-executable instructions that, when executed by the one or more processors individually or collectively, cause the UE to:

select a multiple-input multiple output (MIMO) rank for CSI reporting.

13. The UE of claim 8, wherein at least one of a regression-based machine learning (ML) model or a classification-based ML model is used to predict the CSI based on a radio resource configuration (RRC) of the UE and the estimated CQI corresponding to a measurement instance between the UE and the base station.

14. A method performed by a base station, the method comprising:

receiving a plurality of reference signals from a user equipment (UE);

estimating channel quality information (CQI) for an interval based on the plurality of reference signals, wherein estimating the CQI includes obtaining at least one of mean mutual information per bit (MMIB) or effective exponential signal to noise ratio mapping (EESM);

predicting channel state information (CSI) for the UE based on the estimated CQI;

performing post-processing conversion of the MMIB or the EESM to predict CQI;

determining whether the predicted CQI is greater than the estimated CQI;

reporting, to the UE, CSI based on the predicted CQI in case that the predicted CQI is greater than the estimated CQI; and reporting, to the UE, the CSI predicted based on the estimated CQI in case that the predicted CQI is less than or equal to the estimated CQI.

15. The method of claim 14, wherein the predicting of the CSI for the UE comprises:

predicting at least one of a wideband CSI and a sub-band CSI.

16. The method of claim 15, wherein the wideband CSI is a single CSI reporting for a full wideband and the sub-band CSI reporting is a CSI reporting on a sub-band.

17. The method of claim 14, wherein the CSI is predicted using at least one of a periodic CSI prediction or an aperiodic CSI prediction.

18. The method of claim 14, wherein a regression based machine learning (ML) model and a classification based ML model is used to predict the CSI based on a radio resource configuration (RRC) of the UE and the estimated CQI corresponding to a measurement instance between the UE and the base station.

19. The method of claim 14, further comprising:

reporting the predicted CQI to the UE.

20. The method of claim 14, wherein at least one of a regression-based machine learning (ML) model or a classification-based ML model is used to perform the post-processing conversion of the MMIB or the EESM to the predicted CQI.

* * * * *